United States Patent
Johnson

(10) Patent No.: US 9,198,509 B2
(45) Date of Patent: Dec. 1, 2015

(54) SYSTEM OF RETRACTABLE SHELVES

(71) Applicant: Walter L Johnson, East Point, GA (US)

(72) Inventor: Walter L Johnson, East Point, GA (US)

( * ) Notice: Subject to any disclaimer, the term of this patent is extended or adjusted under 35 U.S.C. 154(b) by 0 days.

(21) Appl. No.: 14/595,967

(22) Filed: Jan. 13, 2015

(65) Prior Publication Data

US 2015/0210322 A1   Jul. 30, 2015

Related U.S. Application Data

(60) Provisional application No. 61/932,665, filed on Jan. 28, 2014.

(51) Int. Cl.
*A47B 43/00* (2006.01)
*A47B 31/06* (2006.01)
*B60P 7/00* (2006.01)

(52) U.S. Cl.
CPC ............... *A47B 43/006* (2013.01); *A47B 31/06* (2013.01); *B60P 7/00* (2013.01)

(58) Field of Classification Search
CPC ....... B62D 33/04; B62D 33/042; B62D 33/08
USPC ............ 108/37, 39, 146, 147.16, 149, 90, 91; 312/247; 414/267
See application file for complete search history.

(56) References Cited

U.S. PATENT DOCUMENTS

| | | | | |
|---|---|---|---|---|
| 449,355 A * | 3/1891 | Suchland | ...................... | 108/146 |
| 848,435 A * | 3/1907 | Brooks | ......................... | 248/423 |
| 929,457 A * | 7/1909 | Macon et al. | ................. | 312/247 |
| 2,429,523 A * | 10/1947 | Murphy | ........................ | 312/312 |
| 2,604,996 A * | 7/1952 | Smith | ........................... | 211/59.3 |
| 2,634,188 A * | 4/1953 | Richard | ........................ | 312/247 |
| 2,649,345 A * | 8/1953 | Hubbard | ....................... | 108/147 |
| 3,157,155 A * | 11/1964 | Duntley | ........................ | 119/489 |
| 4,026,222 A * | 5/1977 | Mueller | ........................ | 108/146 |
| 4,559,879 A * | 12/1985 | Hausser | ........................ | 108/136 |
| 4,701,086 A * | 10/1987 | Thorndyke | ..................... | 410/26 |
| 4,738,575 A * | 4/1988 | Blodgett et al. | ................. | 410/29 |
| 4,884,935 A * | 12/1989 | Smith et al. | .................. | 414/498 |
| 4,912,359 A * | 3/1990 | Offutt et al. | ................... | 312/306 |
| 5,730,578 A * | 3/1998 | Smidler | ........................ | 414/495 |
| 6,250,728 B1 * | 6/2001 | Thorp | ........................... | 312/247 |
| 6,450,360 B1 * | 9/2002 | Hyde | ............................. | 220/559 |
| 7,575,098 B2 * | 8/2009 | Hartley | ........................ | 187/262 |
| 8,336,940 B2 * | 12/2012 | Rasmussen | ................ | 296/24.33 |

(Continued)

FOREIGN PATENT DOCUMENTS

JP   2011-93699   *   5/2011   ................ B66B 5/00

*Primary Examiner* — Michael Safavi

(57) ABSTRACT

The retractable shelf system allows for the compartmentalization of storage container. The system is integrated into the interior space of the storage container and includes a plurality of shelving units distributed along the length of the storage container. Each of the plurality of shelving units includes a platform, a storage shelf, a first pulley support assembly, and a second pulley support assembly. The storage shelf and the platform are positioned coincident and parallel to each other. Each of the pulley support assemblies includes a retraction mechanism and a cable through which the storage shelf is tethered to the platform; the retraction mechanisms are adjacently mounted to the platform while the cables are tethered to the storage shelf. Additionally, a first stopper and a second stopper are attached to the walls of the storage container and provide vertical structural support. The system may be positioned in a functional or retracted configuration.

19 Claims, 6 Drawing Sheets

(56) References Cited

U.S. PATENT DOCUMENTS

| | | | |
|---|---|---|---|
| 8,636,249 B2* | 1/2014 | Conen et al. | 244/118.1 |
| 2005/0006331 A1* | 1/2005 | Engel | 211/151 |
| 2006/0238085 A1* | 10/2006 | Greenberg | 312/306 |
| 2007/0176524 A1* | 8/2007 | Plano et al. | 312/247 |
| 2011/0101837 A1* | 5/2011 | Solomon | 312/319.1 |
| 2012/0025555 A1* | 2/2012 | Rasmussen | 296/24.33 |
| 2013/0315687 A1* | 11/2013 | Downing | 410/144 |
| 2014/0053472 A1* | 2/2014 | DeLorean | 52/29 |
| 2014/0238279 A1* | 8/2014 | Maas et al. | 108/146 |
| 2014/0252930 A1* | 9/2014 | Reid et al. | 312/247 |

\* cited by examiner

US 9,198,509 B2

SYSTEM OF RETRACTABLE SHELVES

The current application claims a priority to the U.S. Provisional Patent application Ser. No. 61/932,665 filed on Jan. 28, 2014.

FIELD OF THE INVENTION

The present invention relates generally to automotive accessories. More specifically, the present invention is a series of shelving units for a truck drawn trailer or other similar storage unit which compartmentalize the storage space with increased efficiency as well aid in expediting the mechanical handling of materials during loading and unloading processes.

BACKGROUND OF THE INVENTION

Tobacco is an agricultural product from the *Nicotiana* genus, a popular commodity around the world. Once processed, tobacco can be consumed and used in medicine or pesticide composition. Conversely, the most popular use for tobacco is in the form of a drug. Tobacco contains a stimulant called alkaloid nicotine which temporarily improves either mental or physical functions or both. Tobacco smoking is one of the more prominent means of absorbing the stimulant in to the body in today's society. Tobacco smoking is the process of burning tobacco and inhaling the resultant smoke; various forms of smoking include cigars, cigarettes, and pipes. Flavor, strength, and quality are all determined by the quality and type of the tobacco leaves used. Generally the geographic vicinity, tobacco sort, and manufacturing processes all play a major role in determining the quality of the smoke. Additionally, a major component that is crucial to the quality of tobacco leaves is the storage and transportation methods. Tobacco leaves are very sensitive to moisture and liquid substances which give off pungent or penetrating odors. In wet and or humid conditions tobacco leaves begin to absorb the water yielding conditions that are perfect for mold growth and subsequent fermentation; this leads to a lower quality product.

Unmanufactured tobacco leaves are traditionally transported in large containers such as 20 or 40 foot trailers in the form of large bales. The size and carrying capacity of such bales are limited due to the sensitive nature of the tobacco leaves. Various precautions are taken to prevent the leaves from fermenting, breaking, or altering in anyway. Precautions include temperature and humidity control, weather proof trailers, surface covers under the bales, and bale size limitations. Larger bale size lead to humidity differences between the leaves in the center and the outer perimeter, if the bale size exceeds a certain size mold will begin to grow in the inner layers of the bale. Additionally, because of the delicate nature of the leaves bales can not be stacked on top of each other which lead to a single level of bales distributed about the floor of the storage/transportation container leaving a substantial amount of space within the container empty. The present invention allows for containers to carry more than one layer of product, doubling the efficiency of the process; and saving money, effort, and time.

DETAIL DESCRIPTIONS OF THE INVENTION

All illustrations of the drawings are for the purpose of describing selected versions of the present invention and are not intended to limit the scope of the present invention.

The present invention is a retractable shelving unit for a storage container 14 such as a truck drawn trailer or other similar storage unit. A multitude of units may be utilized to comprise a system to cover all of the interior space of a storage container 14. More specifically, the present invention is a system which alters the storage container 14 by dividing the interior space to accommodate individual shipments of materials such as bales of tobacco leaves. The present invention provides a flexible compartment configuration as each separate unit may be retracted to modify the interior space according to the needs of the user. Additionally, the retractable nature of each retractable shelf of the system allows for progressive loading and unloading of individual shipments of materials.

Figure 1:
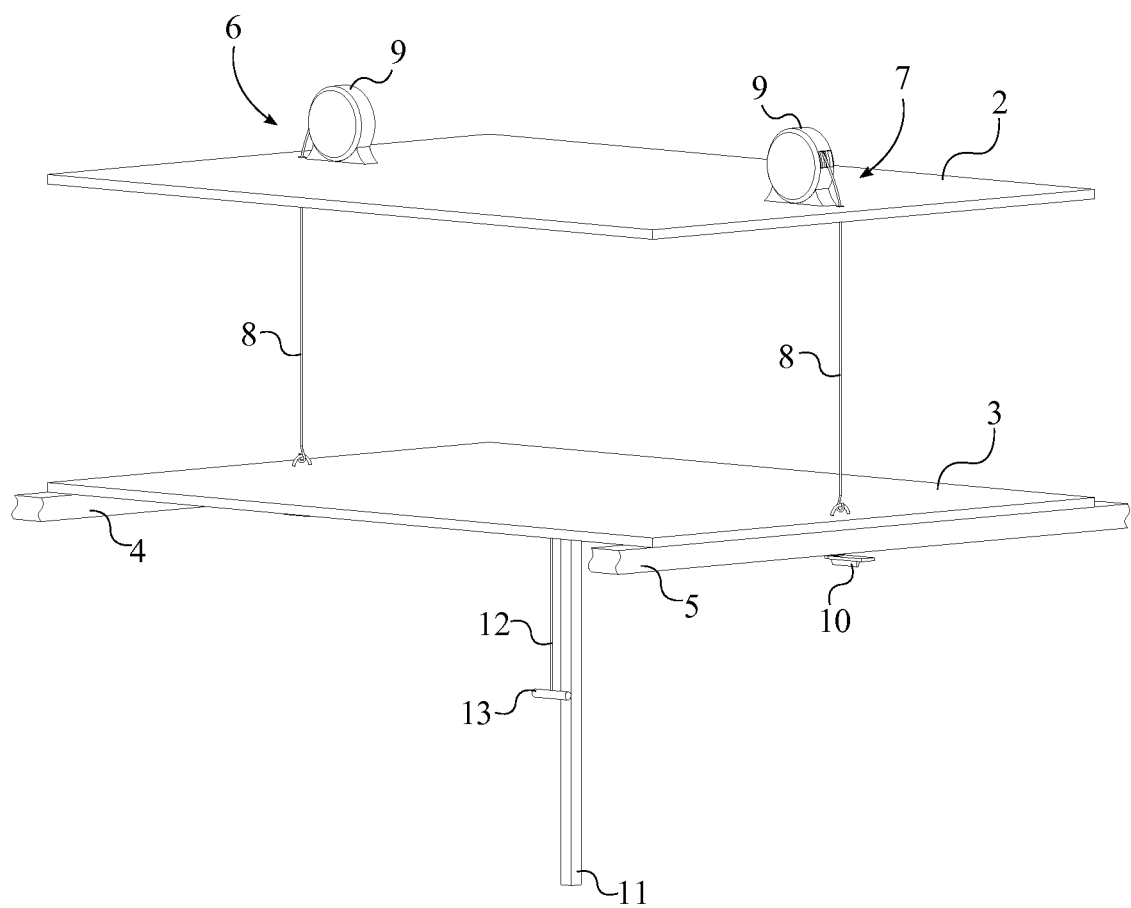
FIG. 1 is a perspective view of a shelving unit in the functional configuration.
Figure 5:
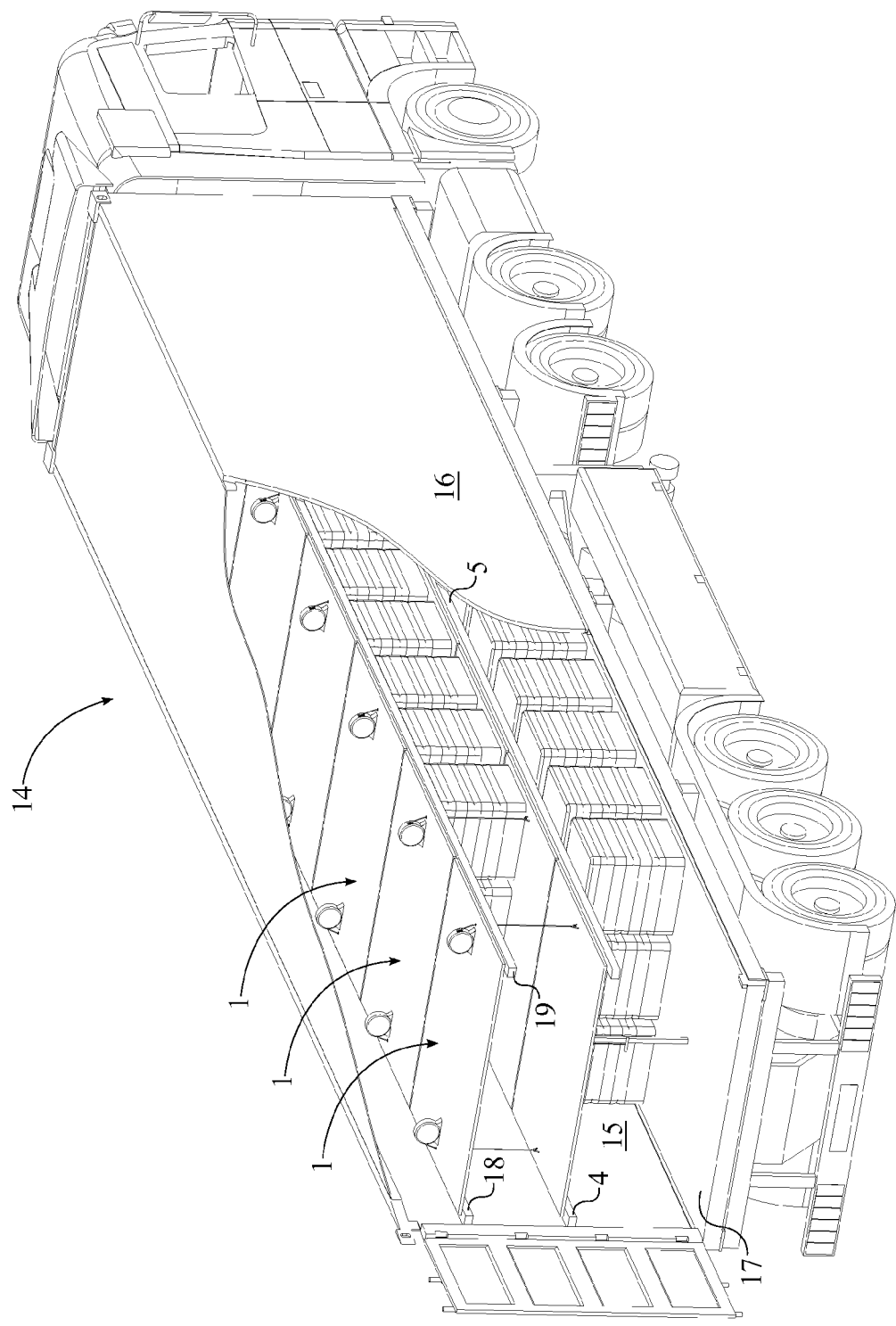
FIG. 5 is an internal perspective view of a system for the present invention being integrated into a storage container.

Referring to FIG. 1 and FIG. 5, the present invention comprises a plurality of shelving units 1, a first stopper 4, and a second stopper 5. The present invention is integrated into the storage container 14 in order to compartmentalize the interior space. The present invention may be integrated into a variety of storage container 14 types including, but not limited to, truck bodies, individual trailers, storage pods, and freight containers to mention a few of non-limiting examples. Each of the plurality of shelving units 1 provides a retractable shelf that may be dropped down and used to hold freight. Once dropped down, the retractable shelf rests against the first stopper 4 and the second stopper 5, which aid and support the weight of the freight.

Figure 6:
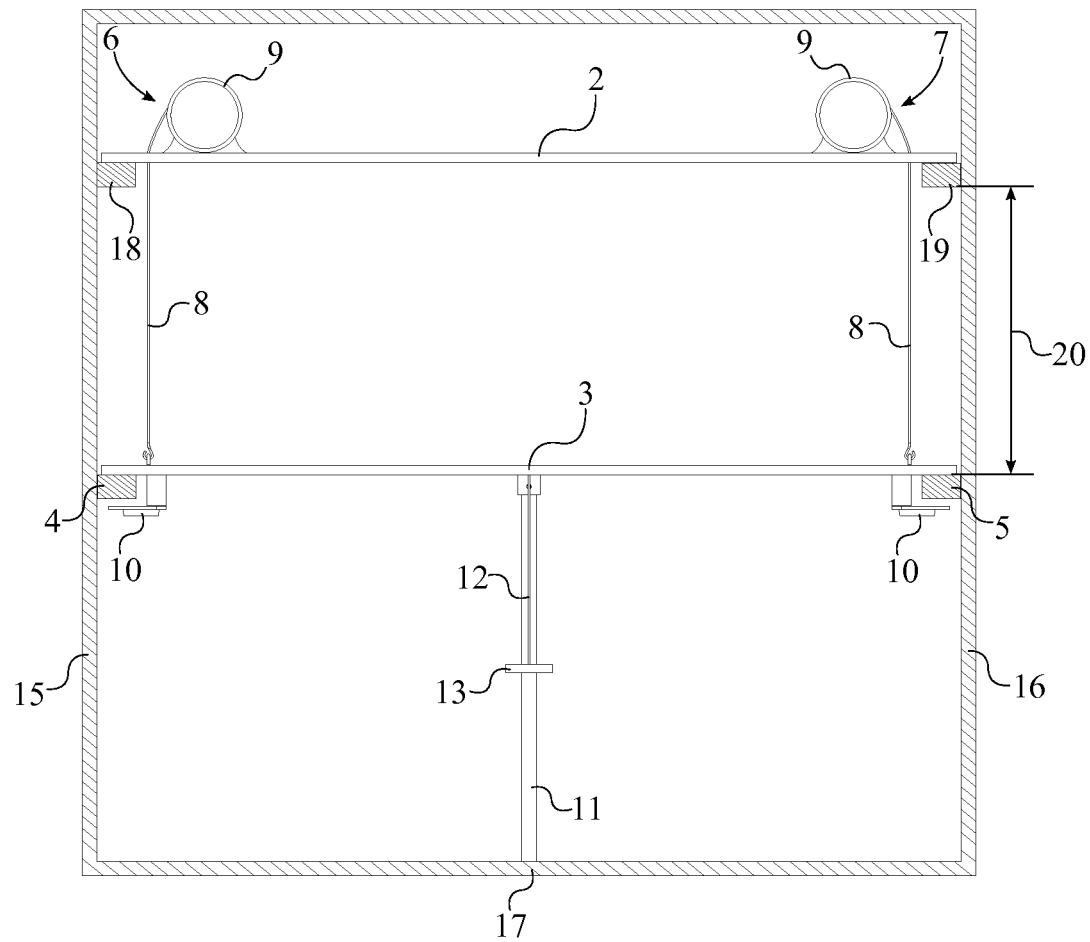
FIG. 6 is a cross-sectional view of a system for the present invention being integrated into a storage container.

Referring to FIG. 1, each of the plurality of shelving units 1 comprises a platform 2, a storage shelf 3, an at least one first pulley support assembly 6, and an at least one second pulley support assembly 7. The platform 2 supports the first pulley support assembly 6 and the second pulley support assembly 7 which in turn are tethered to the storage shelf 3. The storage shelf 3 acts as a storage space onto which freight may be placed upon as seen in FIG. 5. The storage shelf 3 is positioned parallel and concentric to the platform 2 which allow the first pulley support assembly 6 and the second pulley support assembly 7 to evenly support the storage shelf 3. The first pulley support assembly 6 and second pulley support assembly 7 tether the storage shelf 3 to the platform 2 and allow for the storage shelf 3 to retract and be pressed against the platform 2 in order to collapse the shelving unit. The first pulley support assembly 6 and the second pulley support assembly 7 each comprise a cable 8 and a retraction mechanism 9. The retraction mechanism 9 for the first pulley support assembly 6 and the second pulley support assembly 7 are each adjacently mounted to the platform 2. The retraction mechanism 9 may be mounted above or below the platform 2 depending on the needs of the user. In the preferred embodiment, the retraction mechanism 9 is a retractor pulley, which is a mechanism which utilizes a flat spring in conjunction with a pulley to spool up a cord/rope automatically. The storage shelf 3 is tethered to the retraction mechanism 9 of the first pulley support assembly 6 by the cable 8 of the first pulley support assembly 6. In a similar fashion, the storage shelf 3 is also tethered to the retraction mechanism 9 of the second pulley support assembly 6 by the cable 8 of the second pulley support assembly 7. The cable 8 for the first pulley support assembly 6 and the second pulley support assembly 7 are positioned opposite to each other across the storage shelf 3 to ensure the storage shelf 3 maintains a balanced, horizontal orientation. The first stopper 4 and the second stopper 5 run along the length of the storage container 14 and are positioned parallel to each other as well as offset a retraction distance 20 from the storage shelf 3 as seen in FIG. 6. The retraction distance 20 is the vertical distance traveled by the storage shelf 3. The retraction distance 20 may be modified depending on the size and weight of the freight, a larger freight/cargo would yield a longer retraction distance 20 and vice versa. Additionally, the first stopper 4 and the second stopper 5 are positioned opposite to each other across the storage shelf 3 and provide support to either side of the storage shelf 3.

Figure 2:
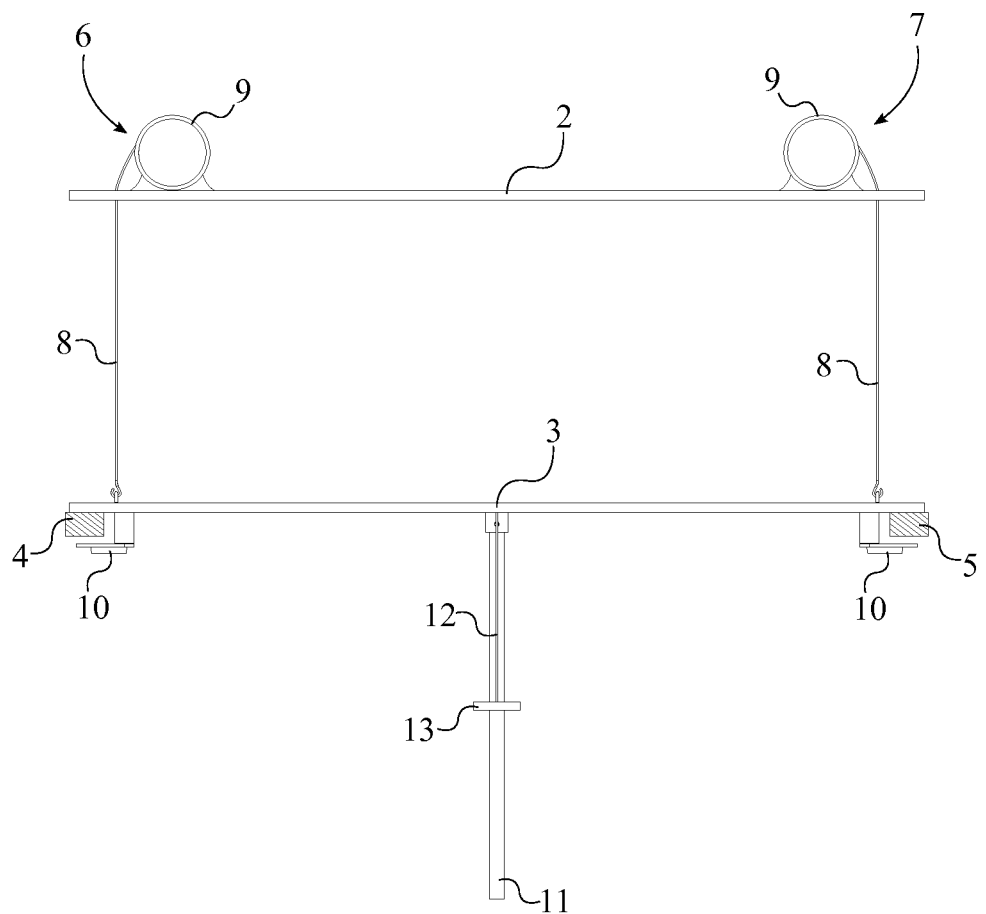
FIG. 2 is a front view of a shelving unit in the functional configuration.
Figure 3:
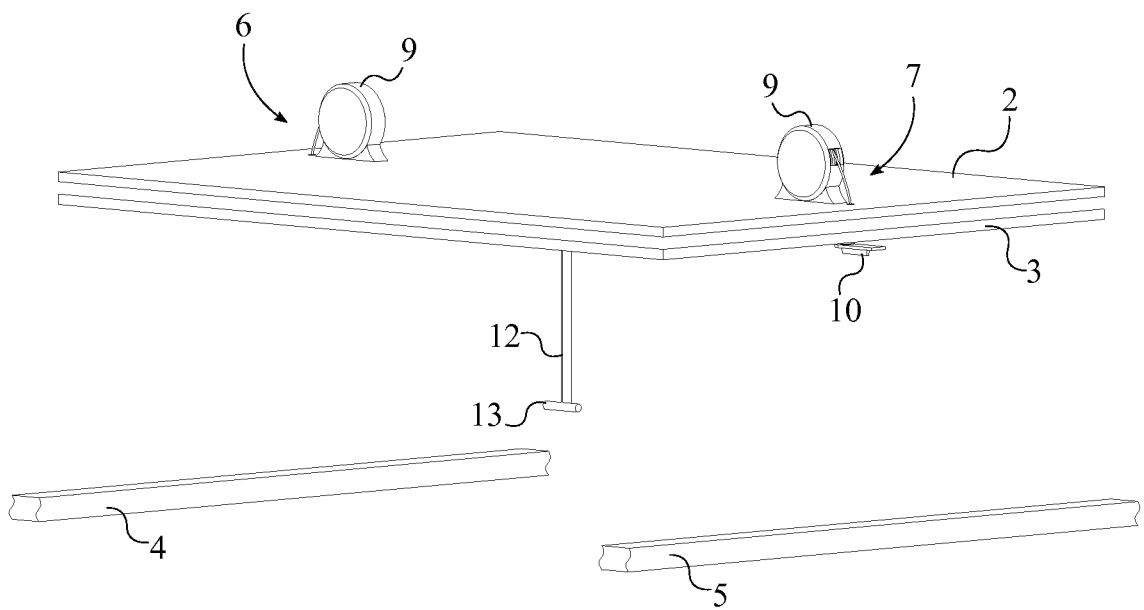
FIG. 3 is a perspective view of a shelving unit in the retracted configuration.
Figure 4:
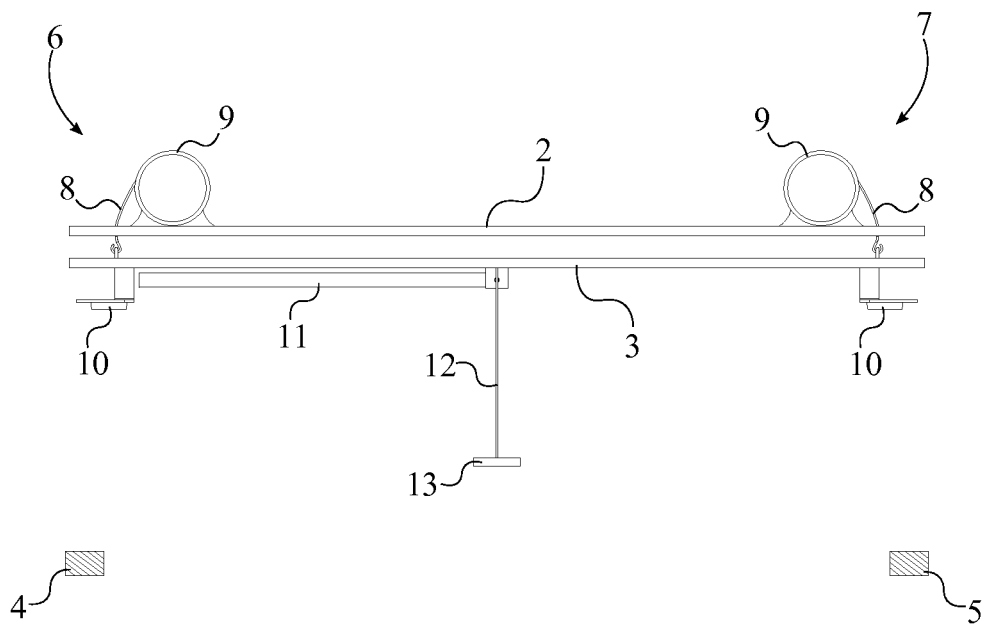
FIG. 4 is a front view of a shelving unit in the retracted configuration.

One of the main objectives of the present invention is to compartmentalize the interior space of the storage container 14 in order to accommodate the storage needs of individual shipments of material. The storage container 14 comprises at least the following components: a first sidewall 15, a second sidewall 16, and a floor 17. The shelving units 1 engage said components of the storage container 14 but it is understood that additional components of the storage container 14 may also exist including, but not limited to, a ceiling, a door(s), and a front wall. The platform 2 is attached to the storage container 14 in between the first sidewall 15 and the second sidewall 16. The platform 2 of each of the plurality of shelving units 1 is serially distributed along the storage container 14 as seen in FIG. 5. Similarly, the storage shelf 3 for each of the plurality of shelving units 1 is serially distributed along the storage container 14. The shelving units 1 may span the length or partial length of the storage container 14, depending on the needs of the user. If used to the full length of the storage container 14, the present invention essentially doubles the possible resting surface of the storage container 14. The first stopper 4 and the second stopper 5 support the storage shelf 3 of each of the plurality of shelving units 1. The first stopper 4 is connected along the first sidewall 15. Similarly, the second stopper 5 is connected along the second sidewall 16. The storage shelf 3 may be positioned into two configurations, a functional configuration and a retracted configuration. In the functional configuration, the storage shelf 3 is lowered down, offset from the platform 2, to be pressed again the first stopper 4 and second stopper 5 as seen in FIG. 1 and FIG. 2. In the retracted configuration, the storage shelf 3 is offset from the first stopper 4 and the second stopper 5, preferably positioned adjacent to the platform 2 as seen in FIG. 3 and FIG. 4. The first stopper 4 and the second stopper 5 are preferably square extrusions of material, such as wood or aluminum in order to keep the weight and cost to a minimum.

Referring to FIG. 1 and FIG. 2, each of the plurality of shelving units 1 further comprises a lowering cable 12, a handle 13, a plurality of locking mechanisms 10, and an at least one support leg 11. The lowering cable 12 and the handle 13 provide a means for lowering the storage shelf 3 into the functional configuration. The lowering cable 12 is adjacently connected to the storage shelf 3, opposite the platform 2. Attached adjacent to the lowering cable 12, opposite the storage shelf 3, is the handle 13. The handle 13 is preferably cylindrical in design and contains ergonomic features which compliment a human hand. By pulling on the handle 13, the user can lower the storage shelf 3 into the functional configuration. The plurality of locking mechanisms 10 secures the storage shelf 3 in the functional configuration to allow for loading or unloading. The plurality of locking mechanisms 10 is mounted on the storage shelf 3, adjacent to the first stopper 4 and the second stopper 5. Each of the plurality of locking mechanisms 10 is preferably a rotatable L-bracket. This design allows each of the plurality of locking mechanisms 10 to rotate and engage the first stopper 4 or the second stopper 5 in order to lock the storage shelf 3 in the function configuration. The rotatable L-bracket may also rotate in the opposite direction in order to release the storage shelf 3.

The support leg 11 aids the first stopper 4 and the second stopper 5 in bearing the weight of the storage shelf 3 and the accompanying freight load. The support leg 11 is hingedly and adjacently mounted to the storage shelf 3, opposite the first pulley support assembly 6. In the functional configuration, the support leg 11 oriented normal to the storage shelf 3, pressed against the floor 17 of the storage container 14, transferring the weight of the freight to the floor 17 of the storage container 14. In the retracted configuration, the support leg 11 is oriented parallel to the storage shelf 3 as well as being pressed against the storage shelf 3. In the retracted configuration the support leg 11 is positioned out of the way. Additionally, the support leg 11 may utilize a compression spring to automatically retract the component when the storage shelf 3 is in the retracted configuration; alternative mechanisms may also be utilized in addition and/or instead of the compression spring to achieve a similar function. The number of support legs 11 per shelving unit 1 is dependent on the type of freight being stored and/or transported. In one embodiment, the at least one support leg 11 is a single support leg 11 that is centrally mounted onto the storage shelf 3. The central positioning of the support leg 11 ensures adequate and symmetric support for the storage shelf 3. In different embodiments, a plurality of support legs 11, a plurality of first pulley support assemblies 6, a plurality of second pulley support assemblies 7, or any combination thereof may be utilized to increase the load capacity of each shelving unit 1.

In another embodiment, each of the plurality of shelving units 1 may be easily installed or removed through the use of a first rail 18 and a second rail 19. The first rail 18 is connected along the first sidewall 15, offset from the first stopper 4 by the retraction distance 20. Similarly, the second rail 19 is connected along the second sidewall 16, offset from the second stopper 5 by the retraction distance 20. In this embodiment, the platform 2 is attached to the storage container 14 by being pressed against the first rail 18 and the second rail 19 as seen in FIG. 1.

Although the invention has been explained in relation to its preferred embodiment, it is to be understood that many other possible modifications and variations can be made without departing from the spirit and scope of the invention as hereinafter claimed.

What is claimed is:

1. A system of retractable shelves comprises:
   a platform;
   a storage shelf;
   a first stopper;
   a second stopper;
   an at least one first pulley support assembly;
   an at least one second pulley support assembly;
   the first pulley support assembly and the second pulley support assembly each comprise a cable and a retraction mechanism;
   the storage shelf being positioned parallel and concentric to the platform;
   the retraction mechanism for the first pulley support assembly being adjacently mounted to the platform;

the storage shelf being tethered to the retraction mechanism of the first pulley support assembly by the cable of the first pulley support assembly;

the retraction mechanism for the second pulley support assembly being adjacently mounted to the platform;

the storage shelf being tethered to the retraction mechanism of the second pulley support assembly by the cable of the second pulley support assembly;

the cable for the first pulley support assembly and the cable for the second pulley support assembly being positioned opposite to each other across the storage shelf;

the first stopper and the second stopper being positioned parallel to each other and offset from the storage shelf;

the first stopper and the second stopper being positioned opposite of each other across the storage shelf;

a plurality of locking mechanisms; and the plurality of locking mechanisms being mounted on the storage shelf, adjacent to the first stopper and the second stopper.

2. The system of retractable shelves as claimed in claim 1 comprises:

the retraction mechanism being retractor pulley.

3. The system of retractable shelves as claimed in claim 1 comprises:

each of the plurality of locking mechanisms being a rotatable L-bracket.

4. The system of retractable shelves as claimed in claim 1 comprises:

an at least one support leg;

the at least one support leg being hingedly and adjacently mounted to the storage shelf, opposite the at least one first pulley support assembly.

5. The system of retractable shelves as claimed in claim 4 comprises:

the at least one support leg being a single support leg;

the single support leg being centrally mounted onto the storage shelf.

6. The system of retractable shelves as claimed in claim 1 comprises;

a lowering cable;

a handle;

the lowering cable being adjacently connected to the storage shelf, opposite the platform;

the handle being adjacently connected to the lowering cable, opposite the storage shelf.

7. The system of retractable shelves as claimed in claim 1 comprises:

a plurality of shelving units;

a storage container;

each of the plurality of shelving units comprises the platform, the storage shelf, the first pulley support assembly, and the second pulley support assembly;

the storage container comprises a first sidewall, a second sidewall, and a floor;

the platform being attached to the storage container in between the first sidewall and the second sidewall;

the platform for each of the plurality of shelving units being serially distributed along the storage container;

the storage shelf for each of the plurality of shelving units being serially distributed along the storage container;

the first stopper being connected along the first sidewall;

the second stopper being connected along the second sidewall.

8. The system of retractable shelves as claimed in claim 7 comprises:

wherein the storage shelf is in a functional configuration;

the storage shelf being pressed against the first stopper and the second stopper.

9. The system of retractable shelves as claimed in claim 8 comprises:

an at least one support leg;

the at least one support leg being oriented normal to the storage shelf;

the at least one support leg being pressed against the floor.

10. The system of retractable shelf as claimed in claim 7 comprises:

wherein the storage shelf is in a retracted configuration;

the storage shelf being offset from the first stopper and the second stopper.

11. The system of retractable shelves as claimed in claim 10 comprises:

an at least one support leg;

the at least one support leg being oriented parallel to the storage shelf;

the at least one support leg being pressed against the storage shelf.

12. The system of retractable shelves as claimed in claim 7 comprises:

a first rail;

a second rail;

the first rail being connected along the first sidewall, offset from the first stopper by a retraction distance;

the second rail being connected along the second sidewall, offset from the second stopper by the retraction distance;

the platform being pressed against the first rail and the second rail.

13. A system of retractable shelves comprises:

a platform;

a storage shelf;

a first stopper;

a second stopper;

an at least one first pulley support assembly;

an at least one second pulley support assembly;

an at least one support leg;

the first pulley support assembly and the second pulley support assembly each comprise a cable and a retraction mechanism;

the storage shelf being positioned parallel and concentric to the platform;

the retraction mechanism for the first pulley support assembly being adjacently mounted to the platform;

the storage shelf being tethered to the retraction mechanism of the first pulley support assembly by the cable of the first pulley support assembly;

the retraction mechanism for the second pulley support assembly being adjacently mounted to the platform;

the storage shelf being tethered to the retraction mechanism of the second pulley support assembly by the cable of the second pulley support assembly;

the cable for the first pulley support assembly and the cable for the second pulley support assembly being positioned opposite to each other across the storage shelf;

the first stopper and the second stopper being positioned parallel to each other and offset from the storage shelf;

the first stopper and the second stopper being positioned opposite of each other across the storage shelf;

the at least one support leg being hingedly and adjacently mounted to the storage shelf, opposite the at least one first pulley support assembly.

14. The system of retractable shelves as claimed in claim 13 comprises:

the retraction mechanism being retractor pulley.

15. The system of retractable shelves as claimed in claim 13 comprises:
a plurality of locking mechanisms;
a lowering cable;
a handle;
the plurality of locking mechanisms being mounted on the storage shelf, adjacent to the first stopper and the second stopper;
each of the plurality of locking mechanisms being a rotatable L-bracket;
the lowering cable being adjacently connected to the storage shelf, opposite the platform;
the handle being adjacently connected to the lowering cable, opposite the storage shelf.

16. The system of retractable shelves as claimed in claim 13 comprises:
the at least one support leg being a single support leg;
the single support leg being centrally mounted onto the storage shelf.

17. The system of retractable shelves as claimed in claim 13 comprises:
a plurality of shelving units;
a storage container;
a first rail;
a second rail;
each of the plurality of shelving units comprises the platform, the storage shelf, the first pulley support assembly, and the second pulley support assembly;
the storage container comprises a first sidewall, a second sidewall, and a floor;
the platform being attached to the storage container in between the first sidewall and the second sidewall;
the platform for each of the plurality of shelving units being serially distributed along the storage container;
the storage shelf for each of the plurality of shelving units being serially distributed along the storage container;
the first stopper being connected along the first sidewall;
the second stopper being connected along the second sidewall;
the first rail being connected along the first sidewall, offset from the first stopper by a retraction distance;
the second rail being connected along the second sidewall, offset from the second stopper by the retraction distance;
the platform being pressed against the first rail and the second rail.

18. The system of retractable shelves as claimed in claim 17 comprises:
wherein the storage shelf is in a functional configuration;
an at least one support leg;
the storage shelf being pressed against the first stopper and the second stopper;
the at least one support leg being oriented normal to the storage shelf;
the at least one support leg being pressed against the floor.

19. The system of retractable shelf as claimed in claim 17 comprises:
wherein the storage shelf is in a retracted configuration;
the storage shelf being offset from the first stopper and the second stopper;
an at least one support leg;
the at least one support leg being oriented parallel to the storage shelf;
the at least one support leg being pressed against the storage shelf.

\* \* \* \* \*